United States Patent
Sung et al.

(10) Patent No.: US 10,399,148 B2
(45) Date of Patent: Sep. 3, 2019

(54) METHOD FOR PREPARING PHASE-SEPARATED LEAD TELLURIDE-LEAD SULFIDE NANOPOWDER USING SOLUTION SYNTHESIS AND PHASE-SEPARATED LEAD TELLURIDE-LEAD SULFIDE NANOPOWDER PREPARED THEREBY

(71) Applicant: Korea University Research and Business Foundation, Seoul (KR)

(72) Inventors: Yun-Mo Sung, Seongnam-Si (KR); Ki-Hyun Cho, Bucheon-Si (KR)

(73) Assignee: Korea University Research and Business Foundation, Seoul (KR)

( * ) Notice: Subject to any disclaimer, the term of this patent is extended or adjusted under 35 U.S.C. 154(b) by 3 days.

(21) Appl. No.: 15/739,536

(22) PCT Filed: Jun. 24, 2016

(86) PCT No.: PCT/KR2016/006741
§ 371 (c)(1),
(2) Date: Dec. 22, 2017

(87) PCT Pub. No.: WO2016/209018
PCT Pub. Date: Dec. 29, 2016

(65) Prior Publication Data
US 2018/0185925 A1 Jul. 5, 2018

(30) Foreign Application Priority Data
Jun. 26, 2015 (KR) ........................ 10-2015-0090885

(51) Int. Cl.
*C01G 21/00* (2006.01)
*C01G 21/21* (2006.01)
(Continued)

(52) U.S. Cl.
CPC .............. *B22F 9/24* (2013.01); *B22F 1/0018* (2013.01); *C01B 17/20* (2013.01); *C01B 19/002* (2013.01);
(Continued)

(58) Field of Classification Search
CPC .... C01G 21/006; C01G 21/21; B82B 3/0009; B01J 14/00
(Continued)

(56) References Cited

FOREIGN PATENT DOCUMENTS

| JP | 2009-114056 A | 5/2009 |
|---|---|---|
| KR | 2009-0108826 A | 10/2009 |
| KR | 2014-0075038 A | 6/2014 |

OTHER PUBLICATIONS

Zhao et al, Enhanced Thermoelectric Performance in PbTe—PbS Nanocomposites, Energy Harvesting and Systems 2015; 2(1-2): 55-62 (Available online Feb. 25, 2015) (Year: 2015).*
(Continued)

*Primary Examiner* — Hoa (Holly) Le
(74) *Attorney, Agent, or Firm* — Fox Rothschild LLP

(57) ABSTRACT

The present invention relates to a method for preparing a phase-separated lead telluride-lead sulfide nanopowder using solution synthesis and a phase-separated lead telluride-lead sulfide nanopowder prepared by the method. The method includes: (a) mixing tellurium and a first solvent, followed by ultrasonic irradiation to prepare a tellurium precursor solution; (b) mixing an organosulfur compound and a second solvent, followed by ultrasonic irradiation to prepare a sulfur precursor solution; (c) mixing lead oxide, a third solvent, and a fourth solvent and heating the mixture to prepare a lead precursor solution; (d) adding the tellurium precursor solution to the lead precursor solution and allowing the mixture to react; (e) adding the sulfur precursor solution to the reaction mixture of step (d) and allowing the
(Continued)

resulting mixture to react; and (f) cooling the reaction mixture of step (e) to room temperature to prepare a phase-separated lead telluride-lead sulfide nanopowder.

9 Claims, 3 Drawing Sheets

(51) Int. Cl.
*B22F 9/24* (2006.01)
*B22F 1/00* (2006.01)
*C01B 17/20* (2006.01)
*C01B 19/00* (2006.01)
*C04B 35/626* (2006.01)
*C04B 35/628* (2006.01)

(52) U.S. Cl.
CPC .... *C04B 35/6264* (2013.01); *C04B 35/62828* (2013.01); *C01P 2002/72* (2013.01); *C01P 2004/04* (2013.01); *C01P 2004/64* (2013.01); *C04B 2235/3296* (2013.01); *C04B 2235/446* (2013.01); *C04B 2235/5454* (2013.01)

(58) Field of Classification Search
USPC .................................. 423/89, 98, 509, 561.1
See application file for complete search history.

(56) References Cited

OTHER PUBLICATIONS

Energy Harvesting and Systems—Cover pages, vol. 1-2, pp. 1-55, 2015 (Year: 2015).*
Girard et al., Analysis of Phase Separation in High Performance PbTe—PbS Thermoelectric Materials, Adv. Funct. Mater. Adv. Funct. Mater. 2013, 23, 747-757. (Year: 2013).*
He et al., Morphology Control of Nanostructures: Na-Doped PbTe—PbS System, | Nano Lett. 2012, 12, 5979-5984. (Year: 2012).*
Jin et al., PbS/PbSe Hollow Spheres: Solvothermal Synthesis, Growth Mechanism, and Thermoelectric Transport Property, | J. Phys. Chem. C 2012, 116, 16207-16216. (Year: 2012).*
Khanna P.K. et al., "One-step synthesis of TOP capped PbSe pyramidal nanocrystals", Materials Chemistry and Physics, Mar. 10, 2006, vol. 96, No. 1, pp. 154-157.
Leontyev et al., "Synthesis of PbTe—SnTe Particles by Thermal Decomposition of Salts to Create Nano-structured Thermoelectric Materials", Crystal Research and Technology, Mar. 9, 2012, vol. 47, No. 5, pp. 561-566.

* cited by examiner

[Fig. 1]
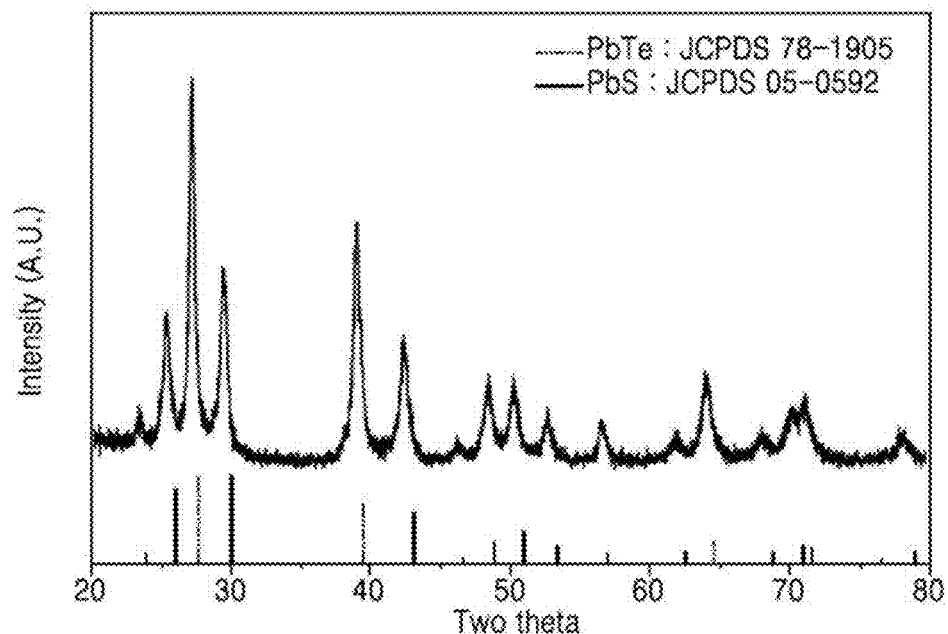
[Fig. 2a]
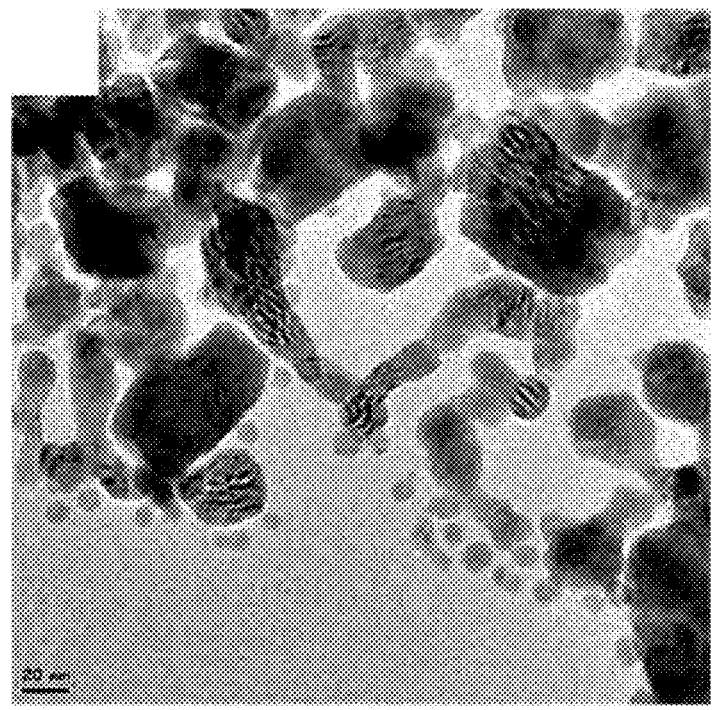

[Fig. 2b]
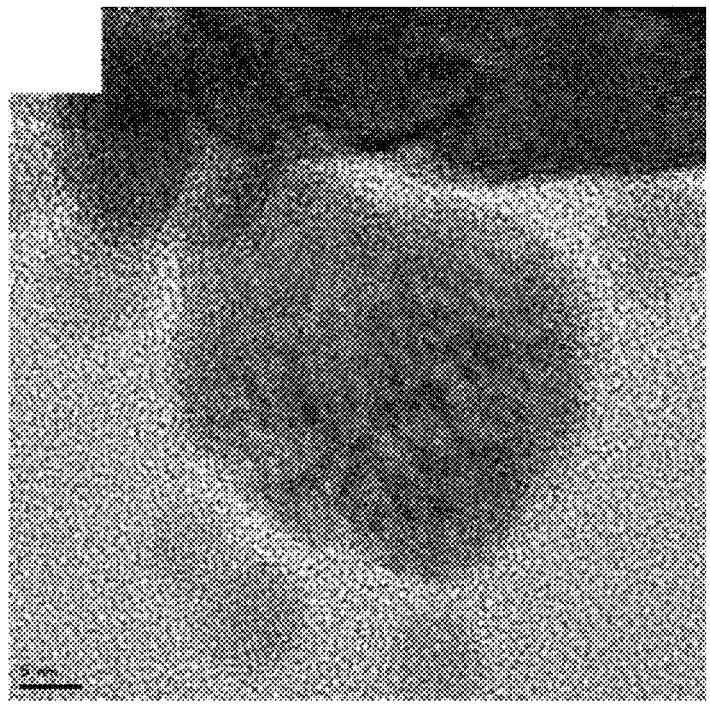
[Fig. 2c]
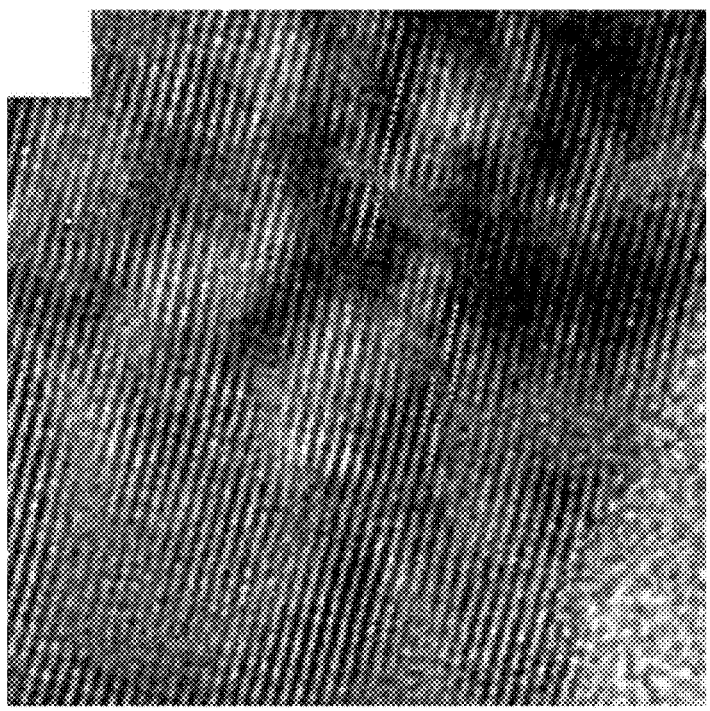

[Fig. 2d]
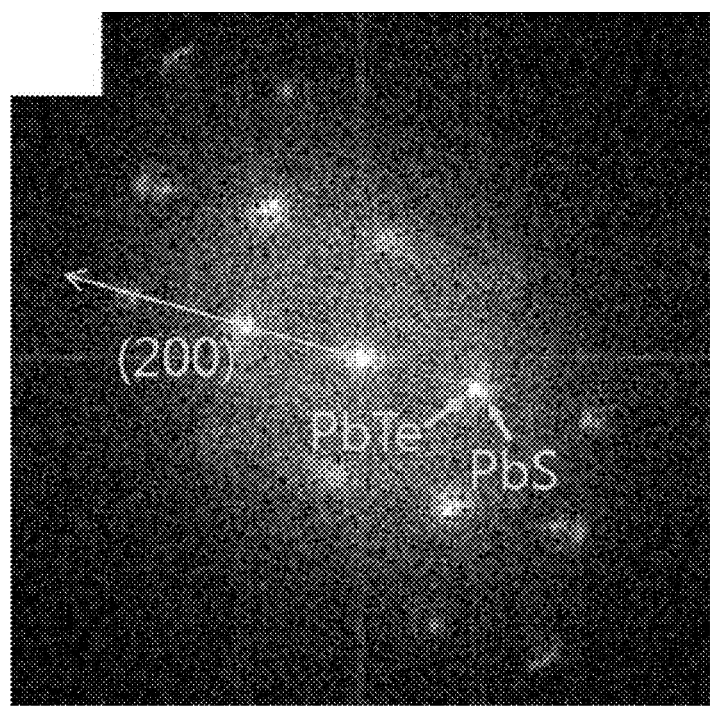

METHOD FOR PREPARING PHASE-SEPARATED LEAD TELLURIDE-LEAD SULFIDE NANOPOWDER USING SOLUTION SYNTHESIS AND PHASE-SEPARATED LEAD TELLURIDE-LEAD SULFIDE NANOPOWDER PREPARED THEREBY

TECHNICAL FIELD

The present invention relates to a method for preparing a colloidally grown phase-separated lead telluride-lead sulfide nanopowder by chemical reactions of lead, tellurium, and sulfur precursors in the form of solutions and a phase-separated lead telluride-lead sulfide nanopowder prepared by the method, particularly a nanopowder having a size of 100 nm or less and in which lead telluride and lead sulfide are spinodally phase-separated.

BACKGROUND ART

Nanomaterials have received continuous attention for their novel characteristics and large surface area induced by size reduction. Continued efforts have been made to prepare various nanosized materials and structures. The unique electrical and physical properties of nanomaterials are attributed to their structural features. Nanomaterials can also be used to change the characteristics of bulk materials through the formation of bulk composites based on their nanostructure. The characteristics of nanomaterials are difficult to achieve by general bulk materials that are at least composed of microscale grains as basic units. In contrast, individual nanoscale grains can change the electrical and physical properties of corresponding bulk materials. For better performance and various physical properties of general bulk materials, efforts have been made to modify the microstructure of the bulk materials. As representative examples, incorporation of dissimilar materials into base materials and phase separation are known. As another example, the use of recrystallization by annealing for grain size reduction is widely known to improve the mechanical properties of materials. However, such top-down approaches are only applied to microscale microstructures.

To overcome this limitation, attempts have been made to prepare bulk composites from nanopowders through sintering. The use of a bottom-up approach for preparing bulk composites from nanopowders by rapid sintering while minimizing the growth of grains enables the production of bulk materials having nanoscale grains. This approach avoids the need for additional annealing and processing and is thus economical in terms of cost and time compared to conventional methods. According to the Hall-Petch equation, the mechanical strength of a material is inversely proportional to the square root of the grain size. This explains improved mechanical properties of materials having nanoscale grains compared to existing materials. In addition, individual grains in nanomaterials enable control over the electrical properties of the materials due to their size effect. Furthermore, structural improvement of nanopowders is considered to control nanoscale microstructures beyond the limitation of existing microscale microstructures. Due to these advantages, research aimed at improving the performance of nanostructures through sintering of nanopowders has been conducted in various fields.

Lead chalcogenides are typical materials for thermoelectric generation and are energy materials for electricity production using waste heat that are dumped into the atmosphere. Thermoelectric generation has received attention as a next-generation technology for mutual conversion between thermal energy and electric energy. The development of existing thermoelectric generation technologies is dependent on the characteristics of materials. Thus, finding good materials for thermoelectric generation is considered important. As representative examples, $Bi_2Te_3$, PbTe, and SiGe are extensively used for thermoelectric generation. In recent years, high-performance thermoelectric materials have been developed through microstructural control. Under these circumstances, research has been conducted aimed at improving the characteristics of thermoelectric materials through microstructural control. Materials for high-performance thermoelectric generation are required to have high electrical conductivity and low thermal conductivity. According to the so-called Wiedemann Franz's law, electrons migrating with thermal energy in a material are known to be difficult to control independently. Since thermal conduction in a material is contributed by lattice vibrations (i.e., phonons) as well as electronic conduction, the total thermal conductivity of the material is lowered by reducing the lattice vibrations to induce maximum thermoelectric performance of the material, which is essential for high-performance thermoelectric technology. For this purpose, studies aimed at suppressing lattice vibrations through microstructural control are currently underway by Prof. Kanatzidis at Northwestern University (U.S.) and Prof. Snyder at California Institute of Technology (U.S.). According to previous studies on microstructural control, the grain size of bulk materials is reduced by crushing and secondary phases are precipitated through phase separation to suppress heat transfer by lattice vibrations, achieving improved thermoelectric performance. However, such top-down approaches are only applied to microscale microstructures, as mentioned above.

There is thus a need to develop a technique for nanoscale microstructure control through phase separation in a nanoscale size and a technique for the synthesis of a controlled nanopowder in the preparation of lead chalcogenides.

SUMMARY

Accordingly, the present invention intends to provide a novel method for preparing a nanopowder in which lead telluride and lead sulfide are spinodally phase-separated, by solution synthesis on a large scale at low temperature in a short time.

Means for Solving the Problems

One aspect of the present invention provides a method for preparing a phase-separated lead telluride-lead sulfide nanopowder using solution synthesis, including: (a) mixing tellurium (Te) and a first solvent, followed by ultrasonic irradiation to prepare a tellurium precursor solution; (b) mixing an organosulfur (S) compound and a second solvent, followed by ultrasonic irradiation to prepare a sulfur precursor solution; (c) mixing lead oxide (PbO), a third solvent, and a fourth solvent and heating the mixture to prepare a lead precursor solution; (d) adding the tellurium precursor solution prepared in step (a) to the lead precursor solution prepared in step (c) and allowing the mixture to react; (e) adding the sulfur precursor solution prepared in step (b) to the reaction mixture of step (d) and allowing the resulting mixture to react; and (f) cooling the reaction mixture of step (e) to room temperature to prepare a phase-separated lead telluride-lead sulfide nanopowder.

The present invention also provides a lead telluride-lead sulfide nanopowder prepared by the method wherein the lead telluride and the lead sulfide are spinodally phase-separated.

Effects of the Invention

The method of the present invention enables the preparation of a nanopowder in which lead telluride and lead sulfide exist in a phase-separated state on a large scale at low temperature in a short time. The present invention is useful for thermoelectric generation and infrared applications. In addition, the present invention proposes an optimum temperature range for the synthesis of the nanopowder in which spinodal phase separation is observed. Spinodal phase separation is a phenomenon that seldom occurs thermodynamically. Therefore, the present invention shows the possibility of nanometer-scale microstructure control, suggesting a novel method for microstructural control.

BRIEF DESCRIPTION OF THE DRAWINGS

FIG. 1 is an X-ray diffraction pattern showing the phases of a phase-separated lead telluride-lead sulfide nanopowder prepared in Example 1.

FIG. 2a shows HRTEM images of a phase-separated lead telluride-lead sulfide nanopowder prepared in Example 1.

FIG. 2b shows HRTEM images of a phase-separated lead telluride-lead sulfide nanopowder prepared in Example 1.

FIG. 2c shows that the planes did not coincide with each other with respect to the spinodal lines that were disconnected, as revealed by different contrasts.

FIG. 2d shows that the phase-separated lead telluride-lead sulfide nanopowder was found to consist of lead telluride and lead sulfide that grew in the same plane direction, which was confirmed by FFT analysis.

DETAILED DESCRIPTION OF THE INVENTION

The present invention will now be described in more detail.

The present invention is directed to a method for preparing a phase-separated lead telluride-lead sulfide nanopowder through chemical synthesis by a hot-injection method into precursors in the form of solutions. Specifically, the method of the present invention includes: (a) mixing tellurium (Te) and a first solvent, followed by ultrasonic irradiation to prepare a tellurium precursor solution; (b) mixing an organosulfur (S) compound and a second solvent, followed by ultrasonic irradiation to prepare a sulfur precursor solution; (c) mixing lead oxide (PbO), a third solvent, and a fourth solvent and heating the mixture to prepare a lead precursor solution; (d) adding the tellurium precursor solution prepared in step (a) to the lead precursor solution prepared in step (c) and allowing the mixture to react; (e) adding the sulfur precursor solution prepared in step (b) to the reaction mixture of step (d) and allowing the resulting mixture to react; and (f) cooling the reaction mixture of step (e) to room temperature to prepare a phase-separated lead telluride-lead sulfide nanopowder.

The first solvent used in step (a) may be selected from the group consisting of trioctylphosphine (TOP), tridiethylaminophosphine (TDP), tributylphophine (TBP), and mixtures thereof.

The organosulfur compound used in step (b) may be selected from the group consisting of bis(trimethylsilyl) sulfide, dimethyl sulfide, and a mixture thereof.

The second solvent used to prepare the sulfur precursor solution in step (b) may be selected from the group consisting of 1-octadecene, trioctylphosphine (TOP), oleylamine, and mixtures thereof.

The third solvent used in step (c) may be selected from the group consisting of 1-octadecene, trioctylphosphine (TOP), oleylamine, and mixtures thereof. The fourth solvent may be selected from the group consisting of oleic acid, octanoic acid, stearic acid, and mixtures thereof.

In step (c), the mixture of the lead oxide (PbO), the third solvent, and the fourth solvent is heated to a predetermined temperature, preferably 120 to 180° C. Outside the range defined above, particularly if the temperature is lower than 120° C., oxygen and water may remain unremoved in the reaction flask when the tellurium precursor solution prepared in step (a) is added and may form impurities during the subsequent reaction for the preparation of the final nanopowder. Further, the lead oxide may not be completely dissolved in the third and fourth solvents. Moreover, the dissolved lead oxide may not react with the tellurium precursor solution. Meanwhile, if the temperature exceeds 180° C., the dissolved lead oxide may be thermally decomposed, resulting in reprecipitation, and as a result, it may fail to react with the tellurium precursor solution.

The reaction times in steps (d) and (e), that is, the reaction time between the dissolved lead oxide and the tellurium precursor solution in step (d) and the reaction time between the reaction mixture of step (d) and the sulfur precursor solution in step (e), are very important factors in the method of the present invention. Preferably, the reaction time between the dissolved lead oxide and the tellurium precursor solution in step (d) is in the range of 3 to 7 minute and the reaction time between the reaction mixture of step (d) and the sulfur precursor solution in step (e) is in the range of 1 to 5 minutes.

Outside these ranges, particularly if the reaction time in step (d) is less than 3 minutes, the sulfur precursor solution is introduced in a state in which a tellurium lead nanopowder is not sufficiently grown, resulting in the formation of a lead sulfide nanopowder. Meanwhile, if the reaction time in step (d) exceeds 7 minutes, a tellurium lead nanopowder and a lead sulfide nanopowder are formed separately. If the reaction time in step (e) is less than 1 minute, a core/shell nanopowder rather than the desired phase-separated nanopowder is synthesized. Meanwhile, if the reaction time in step (e) exceeds 5 minutes, it is unnecessary to continue the reaction because the shape and phase of the nanopowder prepared after completion of the reaction are maintained unchanged.

The present invention also provides a lead telluride-lead sulfide nanopowder prepared by the method wherein the lead telluride and the lead sulfide are spinodally phase-separated.

The lead telluride-lead sulfide nanopowder of the present invention has a size of 100 nm or less and has a structure in which the lead telluride and the lead sulfide are spinodally phase-separated. A super-lattice can be formed from the lead telluride-lead sulfide nanopowder by a simple process through nanoscale microstructure control. Lead telluride and lead sulfide cannot exist in the form of an alloy in a single nanopowder. In contrast, lead telluride and lead sulfide coexist in the nanopowder of the present invention. This coexistence facilitates the fabrication of a device through sintering of the lead telluride-lead sulfide nanopowder of the present invention. The two nano-sized materials have different bandgaps, facilitating control over the electrical properties of the nanopowder.

EXAMPLES

The present invention will be explained in more detail with reference to the following examples, including test examples. These examples are merely illustrative and the present invention is not limited thereto.

Example 1

Preparation of Phase-separated Lead Telluride-lead Sulfide Nanopowder

Step 1: Preparation of TOP-Te Mixture 5.104 g of tellurium was completely dissolved in 40 ml of trioctylphosphine (TOP) by sonication to prepare a trioctylphosphine-Te mixture (hereinafter referred to simply as "TOP-Te").

Step 2: Preparation of bis(trimethylsilyl)sulfide Solution 2 ml of bis(trimethylsilyl)sulfide was completely dissolved in 8 ml of 1-octadecene by sonication to prepare a bis(trimethylsilyl)sulfide solution.

Step 3: Preparation of Tellurium Lead-lead Sulfide Nanopowder 0.23 g of lead oxide, 10 ml of 1-octadecene, and 2 ml of oleic acid were stirred in a 100 ml flask. After the temperature was maintained at 150° C., stirring was continued until the solution became homogeneous. 0.6 ml of the TOP-Te solution prepared in step 1 was rapidly introduced into the flask. The reaction was allowed to proceed for 5 min. Subsequently, 2 ml of the bis(trimethylsilyl)sulfide solution prepared in step 2 was rapidly introduced into the flask. The reaction was allowed to proceed for 3 min. The reaction solution was rapidly cooled to room temperature and washed several times with acetone and toluene to afford a phase-separated lead telluride-lead sulfide nanopowder.

Experimental Example 1

Phase Analysis of the Phase-separated Lead Telluride-lead Sulfide Nanopowder

The phases of the phase-separated lead telluride-lead sulfide nanopowder were determined by X-ray diffraction analysis. The types and compositions of the phases were identified by X-ray diffraction (XRD) using an X-ray diffraction analyzer (Rigaku D/MAX-2500/PC, Tokyo, Japan). The results are shown in FIG. 1.

Results

As shown in FIG. 1, the phase-separated lead telluride-lead sulfide nanopowder was found to consist of pure lead telluride and pure lead sulfide without any secondary phase.

Experimental Example 2

TEM Analysis of the Phase-separated Lead Telluride-lead Sulfide Nanopowder

FIGS. 2a to 2c show HRTEM images of the phase-separated lead telluride-lead sulfide nanopowder, which were recorded using a transmission electron microscope (FEI Tecnai G2 F30) operated at 300 kV.

Results

As shown in FIGS. 2a and 2b, the phase-separated lead telluride-lead sulfide nanopowder had a non-uniform shape and a size of ~20-100 nm. Different contrasts were observed on the surface of the phase-separated powder, unlike in general single-crystal nanopowders. Domains distinguished by different contrasts were found to arise from the spinodal phenomenon.

As shown in FIG. 2c, the planes did not coincide with each other with respect to the spinodal lines that were disconnected, as revealed by different contrasts. As shown in FIG. 2d, the phase-separated lead telluride-lead sulfide nanopowder was found to consist of lead telluride and lead sulfide that grew in the same plane direction, which was confirmed by FFT analysis.

As shown in FIGS. 2c and 2d, the phase-separated lead telluride-lead sulfide nanopowder consisted of lead telluride and lead sulfide that were aligned in the same plane. However, black lines were formed due to the different transmittances of the two materials and lattices were broken and bent due to the different lattice constants of the two materials, which were attributed to the occurrence of spinodal phase separation in the nanopowder.

The invention claimed is:

1. A method for preparing a phase-separated lead telluride-lead sulfide nanopowder using solution synthesis, comprising:
    (a) mixing tellurium (Te) and a first solvent, and exposing the mixture of the tellurium (Te) and the first solvent to ultrasonic irradiation to prepare a tellurium precursor solution;
    (b) mixing an organosulfur (S) compound and a second solvent, and exposing the mixture of the organosulfur (S) compound and the second solvent to ultrasonic irradiation to prepare a sulfur precursor solution;
    (c) mixing lead oxide (PbO), a third solvent, and a fourth solvent and heating the mixture of the lead oxide (PbO), the third solvent, and the fourth solvent to prepare a lead precursor solution;
    (d) adding the tellurium precursor solution prepared in step (a) to the lead precursor solution prepared in step (c) to form a first reaction mixture and allowing the first reaction mixture to react;
    (e) adding the sulfur precursor solution prepared in step (b) to the first reaction mixture of step (d) to form a second reaction mixture and allowing the second reaction mixture to react; and
    (f) cooling the second reaction mixture of step (e) to room temperature to provide a phase-separated lead telluride-lead sulfide nanopowder.

2. The method according to claim 1, wherein the first solvent used in step (a) is selected from the group consisting of trioctylphosphine (TOP), tridiethylaminophosphine (TDP), tributylphophine (TBP), and mixtures thereof.

3. The method according to claim 1, wherein the organosulfur compound used in step (b) is selected from the group consisting of bis(trimethylsilyl)sulfide, dimethyl sulfide, and a mixture thereof.

4. The method according to claim 1, wherein the second solvent used in step (b) is selected from the group consisting of 1-octadecene, trioctylphosphine (TOP), oleylamine, and mixtures thereof.

5. The method according to claim 1, wherein the third solvent used in step (c) is selected from the group consisting of 1-octadecene, trioctylphosphine (TOP), oleylamine, and mixtures thereof.

6. The method according to claim 1, wherein the fourth solvent is selected from the group consisting of oleic acid, octanoic acid, stearic acid, and mixtures thereof.

7. The method according to claim 1, wherein, in step (c), the mixture is heated to 120 to 180° C.

8. The method according to claim 1, wherein the reaction time in step (d) is from 3 to 7 minute.

9. The method according to claim 1, wherein the reaction time in step (e) is from 1 to 5 minutes.

* * * * *